June 13, 1944.  H. F. HAGEMEYER  2,351,505
DISPENSING MECHANISM
Filed July 11, 1939
Fig. 1.
Fig. 2.
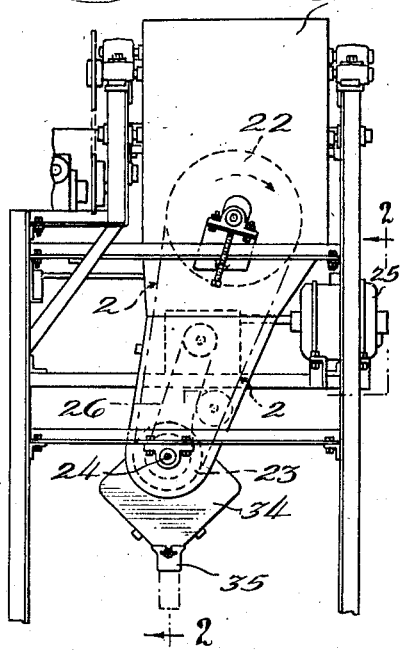
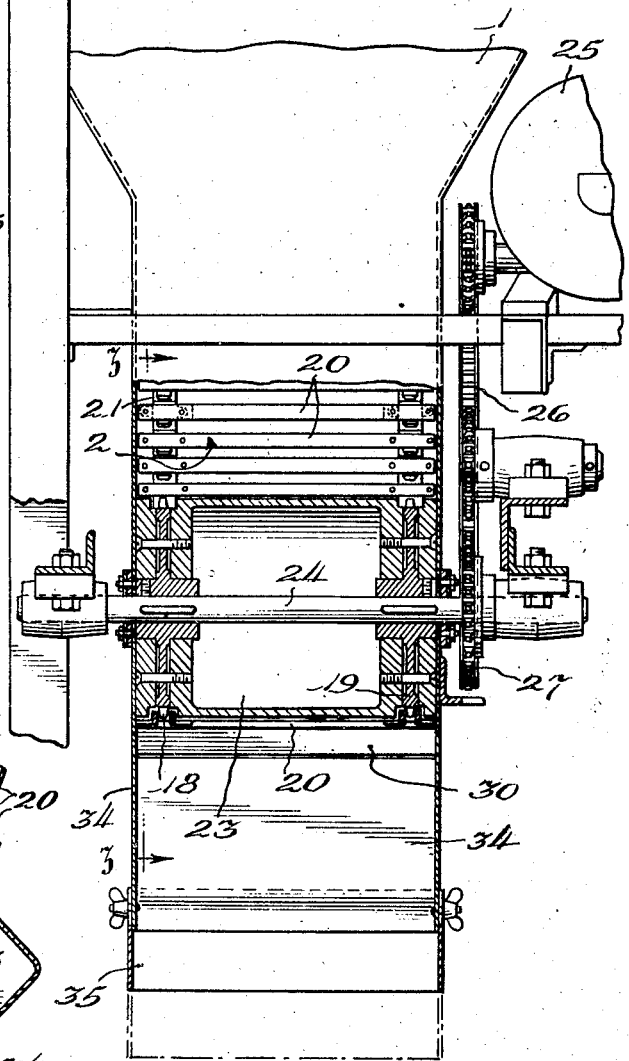
Fig. 3.
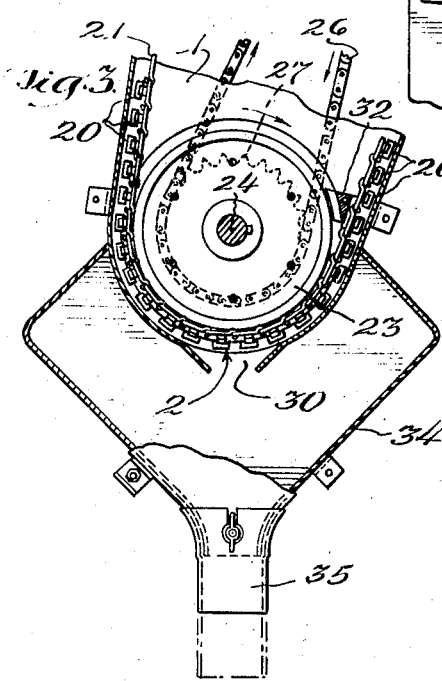
Inventor
Henry F. Hagemeyer
By Williams, Bradbury & Hinkle
Attorneys Patented June 13, 1944

2,351,505

UNITED STATES PATENT OFFICE 2,351,505

DISPENSING MECHANISM

Henry F. Hagemeyer, Chicago, Ill., assignor to Castings Patent Corporation, a corporation of Illinois Application July 11, 1939, Serial No. 283,868

3 Claims. (Cl. 222—371)

My invention relates generally to dispensing apparatus, and more particularly to apparatus for discharging finely divided and powdered materials at a controlled rate.

The invention is illustrated as it may be employed in a machine for feeding the powdered ingredients used in the making of gypsum base molds for metal castings.

In general, my machine incorporates a storage compartment for powdered material in the lower portion of which is located a measuring device for such material. Preferably this mechanism consists of a belt carrying equally spaced transverse slats which, moving rapidly through the body of material in the storage chamber, maintain it in a state of agitated or live suspension so that the mass will be of uniform density throughout. The belt slats pass closely above a discharge aperture in the bottom of the storage chamber through which, when open, may fall in succession powdered material increments of equal weight trapped in the spaces between the slats. Because of the equality and closeness of the slat spacing the powdered material falls from the bottom of the storage chamber in a substantially continuous stream of uniform density and of predetermined size and shape, preferably as a thin sheet.

It is thus the principal object of my invention to provide an improved means for feeding powdered material at a controlled rate.

A further object is to provide an improved apparatus for dispensing powdered materials, in which the material being dispensed is maintained in a loose fluffy condition.

Other objects will appear from the following description, reference being had to the accompanying drawing, in which:

Fig. 1 is a side elevational view of portions of a structure incorporating the improved powder dispensing apparatus;

Fig. 2 is an enlarged vertical sectional view, taken on the line 2—2 of Fig. 1; and Fig. 3 is a vertical sectional view, taken on the line 3—3 of Fig. 2.

The apparatus of my invention comprises a storage bin 1 for the powdered material. The material is supplied to the bin in any suitable manner which will maintain the bin substantially completely filled at all times. Within the lower portion of the bin 1 there is located a measuring belt 2, which comprises a plurality of equally spaced cross bars or slats 20 having their opposite ends secured to spaced chains 21.

The chains 21 are carried by an idler drum 22 mounted in the upper portion of the storage bin 1, and are driven by sprockets 18 and 19 assembled in a drum 23 and nonrotatably secured to a shaft 24. The shaft 24 is driven by a motor 25 through suitable power transmission means including a chain 26 and a sprocket 27, the latter being secured to the shaft. The drum 23 is driven at a speed sufficient to move the slats 20 rapidly through the body of powdered material to keep it in a state of live suspension so that it will be of a uniform and constant density throughout the zone of movement of the belt 2.

As shown in Fig. 2, the drum 23 extends from side to side of the bottom of bin 1 to seal the powder containing portion thereof from the discharge outlet 30, and to provide a narrow curved passageway around its periphery through which the belt 2 moves.

Not only does the belt act as an agitator for the stored material but the equally spaced bars 20 constitute barriers defining measuring chambers therebetween of equal size. These measuring chambers are filled with constant density powdered material as the belt passes through the upper portion of the storage bin, and as the slats move down closely adjacent to the bin wall, as shown in Fig. 3, the measuring spaces are completely closed between the drum 23 and such wall. In this way successive increments, portions, or parcels of powdered material of equal volume are move from the main boy of the material in the storage bin 1 to the discharge outlet 30. Because of the bending of the belt beneath the drum 23 the outer edges of adjacent slats are spread slightly apart to free the powdered material trapped therebetween. It will be evident that since the material is kept in uniform density suspension and is moved to the outlet in increments of equal volume, a definite known weight of powdered material, directly proportional to the number of increments, may readily be delivered, depending on the time interval during which it is desired to have such a known quantity of material dispensed, the speed of the belt 2 may be established for bars of a certain width and spaced a certain distance apart.

In order to weigh batches of material within slight tolerances, the measuring chambers should be quite small. The speed of the measuring belt may be regulated to change the rate of material delivered and automatic mechanism may be provided to start and stop the belt as required to dispense batches of any weight. To prevent powdered material packing between drum 23 and the measuring belt, thus causing the slats 20 to scrape heavily against the wall of the bin 1, and enabling additional powdered material to be packed into the measuring spaces, scrapers 32 are provided in the entering angle between the drum and belt to scrape all powdered material from the drum periphery. In lieu of starting and stopping the belt 2 to obtain a batch of the desired weight, a suitable closure over the opening 30 may be opened for the length of time necessary to dispense the requisite amount of the powdered material.

From the opening 30 the powdered material drops in a falling sheet into a suitably shaped hopper 34, which is provided with an adjustable discharge spout 35.

While I have shown and described a preferred embodiment of my invention, it will be apparent that numerous variations and modifications thereof may be made without departing from the underlying principles of the invention. I therefore desire, by the following claims, to include within the scope of my invention all such variations and modifications by which substantially the results of my invention may be obtained through the use of substantially the same or equivalent means.

I claim:

1. Dispensing mechanism for powdered material having bad packing characteristics comprising a storage bin having an outlet adjacent the lower end thereof, means for delivering a measured quantity of powdered material from said storage bin to said outlet, said means comprising a pair of rotatable drums, one of said drums being positioned in the upper portion of said bin and said other drum being positioned adjacent the discharge outlet, a pair of chains spaced a predetermined distance apart adapted to revolve around said drums, a plurality of elongated bars extending transversely of the direction of movement of said chains, said bars being secured to said chains at each end thereof, a portion of the wall of said bin being shaped to form an arcuate slot in conjunction with the surface of said drum, said slot having a width slightly in excess of the thickness of said bars and said bars and said chains being arranged to pass through said slot, and means for continuously driving said chains and bars rapidly through said material, whereby said bars when travelling in the upward direction keep such material in a state of live suspension and when travelling in a downward direction through said slot carry a measured quantity of powdered material to said outlet.

2. Dispensing mechanism for powdered material having bad packing characteristics comprising a storage bin having an outlet adjacent the lower end thereof, means for delivering measured quantities of powdered material to said outlet, said means comprising a pair of rotatable drums, one of said drums being positioned in the upper portion of said bin and the other of said drums being positioned adjacent said outlet, a pair of chains spaced a predetermined distance apart and adapted to revolve around said drums, a plurality of elongated bars extending transversely of the direction of movement of said chains and constituting therebetween measuring chambers of equal volume, said bars being secured at each end to said chains, said bin becoming smaller in cross-section toward the bottom, a portion of the wall of said bin operating in conjunction with said lower drum for forming a restriction slightly greater in width than the thickness of said bars and said bars passing through said restriction and means for continuously driving said chains and said bars rapidly through said material whereby said bars when travelling in the upward direction keep said material in a state of live suspension and when travelling in the downward direction cooperate with one wall of said bin and said lower drum to pack a measured quantity of material between said bars.

3. A dispensing mechanism for powdered material having bad packing characteristics, comprising a storage bin having an outlet adjacent the lower end thereof, means for delivering a measured quantity of powdered material from said storage bin to said outlet and for keeping said supply of material in live suspension, said means comprising a rotatable drum adjacent said outlet, a slat type conveyor passed around said drum and movable through the material in said bin to keep said material in live suspension, said conveyor being movable past said outlet and adapted to carry material thereto between said slats, and means forming a slot closely embracing said conveyor to regulate the quantity of material carried therethrough to said outlet by said conveyor.

HENRY F. HAGEMEYER.